US009098246B2

(12) United States Patent
Zawacki et al.

(10) Patent No.: US 9,098,246 B2
(45) Date of Patent: Aug. 4, 2015

(54) ADJUSTABLE HINGE STIFFNESS

(71) Applicants: Jennifer Greenwood Zawacki, Hillsborough, NC (US); Vincent James DeCaro, Apex, NC (US); John Weldon Nicholson, Cary, NC (US); Steven Richard Perrin, Raleigh, NC (US); Scott Edwards Kelso, Cary, NC (US); Nicole L. Jefferies, Cary, NC (US)

(72) Inventors: Jennifer Greenwood Zawacki, Hillsborough, NC (US); Vincent James DeCaro, Apex, NC (US); John Weldon Nicholson, Cary, NC (US); Steven Richard Perrin, Raleigh, NC (US); Scott Edwards Kelso, Cary, NC (US); Nicole L. Jefferies, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 391 days.

(21) Appl. No.: 13/624,312

(22) Filed: Sep. 21, 2012

(65) Prior Publication Data

US 2014/0085793 A1    Mar. 27, 2014

(51) Int. Cl.
G06K 1/16          (2006.01)
H05K 5/00          (2006.01)
G06F 1/16          (2006.01)

(52) U.S. Cl.
CPC ............ *G06F 1/1681* (2013.01); *G06F 1/1683* (2013.01)

(58) Field of Classification Search
CPC .............................. G06F 1/1681; G06F 1/1683
USPC ............................ 361/679.2, 679.27–679.29, 361/679.57–679.58, 725–727; 70/58, 70/159–162; 292/8, 24, 30–32, 40–42
See application file for complete search history.

(56) References Cited

U.S. PATENT DOCUMENTS

| 4,038,694 | A | * | 7/1977 | Leshik ....................... 360/251.1 |
|---|---|---|---|---|
| 5,077,551 | A | * | 12/1991 | Saitou ............................ 345/207 |
| 6,522,529 | B1 | * | 2/2003 | Huilgol et al. ........... 361/679.06 |
| 6,654,068 | B1 | * | 11/2003 | Brewington et al. ......... 348/827 |
| 6,781,819 | B2 | * | 8/2004 | Yang et al. ............... 361/679.09 |
| 6,980,420 | B2 | * | 12/2005 | Maskatia et al. ......... 361/679.57 |
| 7,136,282 | B1 | * | 11/2006 | Rebeske .................. 361/679.55 |
| 7,338,023 | B2 | * | 3/2008 | Liu ............................. 248/284.1 |
| 7,918,427 | B2 | * | 4/2011 | Wang ......................... 248/278.1 |
| 8,297,809 | B2 | * | 10/2012 | Emmert ........................ 362/457 |
| 8,763,969 | B2 | * | 7/2014 | Wu et al. .................... 248/284.1 |
| 2002/0162192 | A1 | * | 11/2002 | Su-Man .......................... 16/337 |
| 2006/0007644 | A1 | * | 1/2006 | Huilgol et al. ................ 361/681 |
| 2006/0044752 | A1 | * | 3/2006 | Lin et al. ....................... 361/686 |
| 2006/0061958 | A1 | * | 3/2006 | Solomon et al. .............. 361/686 |
| 2008/0184529 | A1 | * | 8/2008 | Thom ............................. 16/337 |
| 2010/0073857 | A1 | * | 3/2010 | Lin et al. .................. 361/679.27 |
| 2011/0069445 | A1 | * | 3/2011 | Haren et al. ............. 361/679.44 |
| 2011/0239406 | A1 | | 10/2011 | Macernis |
| 2011/0299233 | A1 | * | 12/2011 | Kim ......................... 361/679.01 |
| 2012/0005861 | A1 | | 1/2012 | Homner et al. |
| 2013/0155592 | A1 | * | 6/2013 | Takahashi ................ 361/679.08 |

* cited by examiner

*Primary Examiner* — Adrian S Wilson
*Assistant Examiner* — Abhishek Rathod
(74) *Attorney, Agent, or Firm* — Brian J. Pangrle

(57) ABSTRACT

An assembly can include a first component; a second component that includes a socket; a processor and a memory accessible by the processor, the processor and memory being included in one or more of the first component and the second component; and an interconnection mechanism for pivotable interconnection of the first component and the second component about a pivot axis where the interconnection mechanism includes a hinge that defines the pivot axis, a prong pivotable about the pivot axis, a latch mechanism to latch the second component to the interconnection mechanism with the prong received by the socket of the second component, an actuator to unlatch the latch mechanism, and a lever to adjust the hinge to a high stiffness state to adjust the hinge to a low stiffness state. Various other apparatuses, systems, methods, etc., are also disclosed.

18 Claims, 12 Drawing Sheets

ADJUSTABLE HINGE STIFFNESS

TECHNICAL FIELD

Subject matter disclosed herein generally relates to technology for interconnection mechanisms such as, for example, hinges.

BACKGROUND

Various types of computing devices, display devices, computing and display devices, etc. exist where, for example, one device may cooperate with another device or component of an assembly. As an example, consider a computing and touch display device that cooperates with a keyboard device, for example, to allow for input of information via the keyboard device in addition to, or as an alternative to, input of information via the touch display of the computing and touch display device. In such an example, the computing and touch display device and the keyboard device may interconnect via a physical interconnection mechanism. Various technologies and techniques described herein pertain to physical interconnections of devices, components, assemblies, etc. and, for example, locking mechanisms.

SUMMARY

An assembly can include a first component; a second component that includes a socket; a processor and a memory accessible by the processor, the processor and memory being included in one or more of the first component and the second component; and an interconnection mechanism for pivotable interconnection of the first component and the second component about a pivot axis where the interconnection mechanism includes a hinge that defines the pivot axis, a prong pivotable about the pivot axis, a latch mechanism to latch the second component to the interconnection mechanism with the prong received by the socket of the second component, an actuator to unlatch the latch mechanism, and a lever to adjust the hinge to a high stiffness state for the second component latched to the interconnection mechanism and to adjust the hinge to a low stiffness state for the second component unlatched from the interconnection mechanism. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
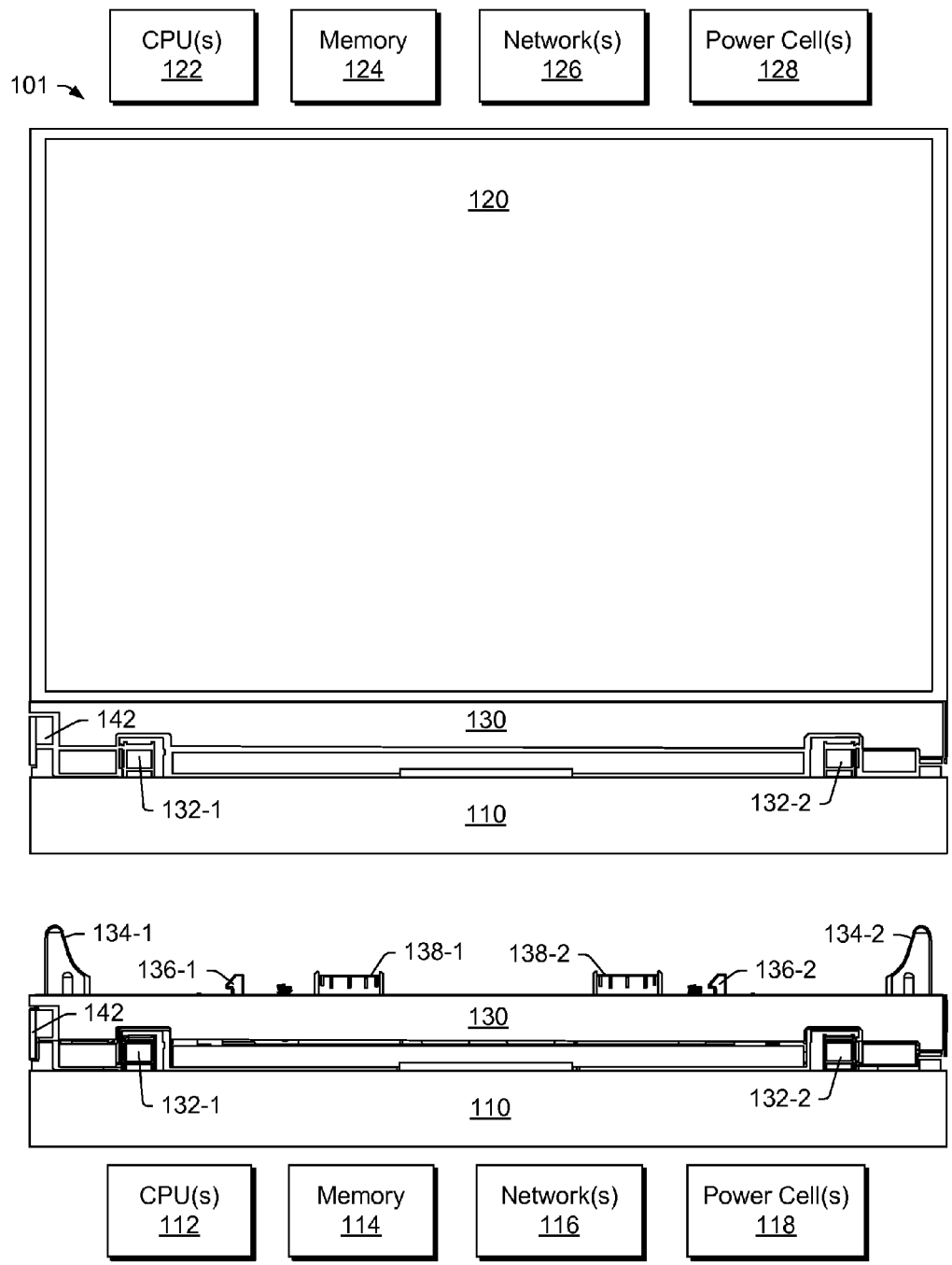
FIG. 1 is a diagram of an example of an assembly.

FIG. 1 shows an example of an assembly 101 that includes a base component 110, a display component 120 and an interconnection mechanism 130. In the example of FIG. 1, the base component 110 may include one or more processors 112, memory 114 (e.g., one or more memory devices), one or more network interfaces 116, and one or more power cells 118. In the example of FIG. 1, the display component 120 may include one or more processors 122, memory 124 (e.g., one or more memory devices), one or more network interfaces 126, and one or more power cells 128.

In the example of FIG. 1, the interconnection mechanism 130 can include one or more hinges 132-1, 132-2, one or more prongs 134-1, 134-2, one or more latches 136-1, 136-2, and one or more electrical connectors 138-1, 138-2. In the example of FIG. 1, the interconnection mechanism 130 includes an actuator 142 to unlatch a latch mechanism that includes the latches 136-1, 136-2 for latching the display component 120 to the interconnection mechanism 130. Thus, upon actuation of the actuator 142 (e.g., depressing a button, etc.), the latches 136-1, 136-2 (e.g., translatable hook shaped latches, etc.) can unlatch the display component 120, which can then be disconnected from the interconnection mechanism 130.

In the example of FIG. 1, the interconnection mechanism 130 includes the one or more hinges 132-1, 132-2 for pivotable interconnection of the base component 110 and the display component 120. For example, a hinge may define a pivot axis (e.g., via an axel, etc.) about which one or more components may pivot. In the example of FIG. 1, the display component 120 may, when connected to the interconnection mechanism 130, pivot in a range of at least 90 degrees and optionally up to about 360 degrees with respect to the base component 110. In such an example, the display component 120 may be positioned in a closed state, for example, pivoted downward toward the base component 110, in an angled open state, for example, as shown in FIG. 1, and optionally in a flat state where the display component 120 and the base component 110 are substantially in the same plane.

As an example, for the assembly 101, the amount of force to pivot the prongs 136-1 and 136-2 about the hinges 132-1 and 132-2 may remain the same whether the component 120 is connected or disconnected from the interconnection mechanism 130. To support the component 120, which may weigh about 0.5 kg to about 1 kg, each of the hinges 132-1 and 132-2 has a respective stiffness. Stiffness of a hinge may be achieved, for example, via frictional force, biasing force (e.g., tensioning force) or a combination of both.

As an example, consider a door with door hinges where if hinge pins of the door hinges are too tight, the door may be stiff and possibly cause creaking or squeaking when the door is opened or closed. For door hinges, if the hinge pins are too loose, alignment may suffer as the weight of the door causes misalignment of hinge components about hinge axes. As to tension, consider a gate with a gate hinge where the gate hinge includes a tension mechanism that biases the gate towards a closed position or closed state (e.g., automatically closing gate). In the gate example, the tension mechanism of the gate hinge may be a spring that can overcome frictional forces as well as weight of the gate. If the stiffness of the gate hinge is too high, the spring may not provide sufficient biasing force to overcome the stiffness; whereas, if the stiffness is too low, the gate hinge may cause a gate to gain momentum and slam against a gate frame to which the gate hinge attaches the gate. The foregoing door and gate examples point to two types of hinges, hinges without a tension mechanism and hinges with a tension mechanism. In both examples, stiffness may impact operation and hence performance.

As an example, in the assembly 101, which may be a "clamshell" assembly, some amount of stiffness prevents the component 120 from freely pivoting about the hinges 132-1 and 132-2 of the interconnection mechanism 130 to a fully opened position (e.g., a fully opened state) or to a closed position (e.g., a closed state) with respect to the component 110 (e.g., freely pivoting due to mass and gravity). However, when the component 120 is disconnected from the interconnection mechanism 130, which usually occurs in an open state, the prongs 134-1 and 134-2 remain rotated away from the component 110 (e.g., sticking up, extending from the interconnection mechanism 130 and pointing away from the component 110). Thus, the position of the prongs 134-1 and 134-2, or more generally, the interconnection mechanism 130 with respect to the component 110, may impact fit of the component 110 and interconnection mechanism 130 into a bag (e.g., a carrying case, etc.). Further, depending on shape, edge finish, etc., of the prongs 134-1 and 134-2, they may pose a damage risk to the bag (e.g., possible scrape, tear, puncture, etc.). Yet further, when in an upright position without the component 120 connected to the interconnection mechanism 130, the prongs 134-1 and 134-2 (e.g., or other features of the interconnection mechanism 130) may be an aesthetic detractor from the look of the base 110.

With the component 120 disconnected from the interconnection mechanism 130, a user may wish to pivot the interconnection mechanism 130 to a closed position (e.g., a closed state) with respect to the component 110. To do so, the user must overcome the stiffness, tension, etc., of the hinges 132-1 and 132-2. The amount of force required may be sufficient to cause a broken finger nail, a slip, etc. The amount of force required may be sufficient to cause damage to the component 110, for example, if a finger or other object slips and contacts a key, keys, surface, track pad, etc., of the component 110. The combination of risks, aesthetics, etc., can detract from a user's impression of an assembly such as the assembly 101 of FIG. 1.

Figure 2:
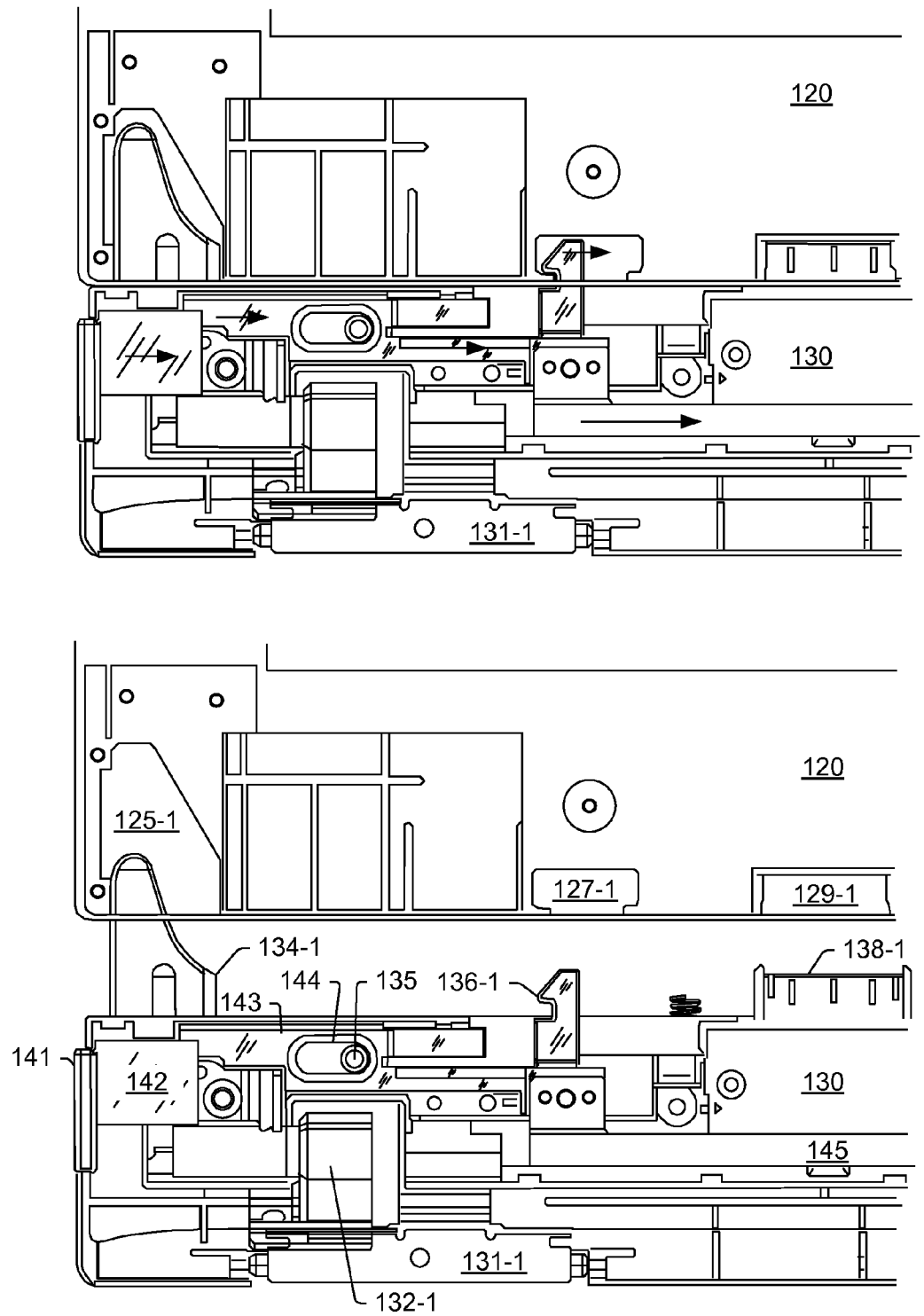
FIG. 2 is a diagram of an example of an assembly that includes a latch mechanism actuatable by an actuator for disconnection of a component from the assembly.

FIG. 2 shows various parts of the assembly 101 of FIG. 1 in a connected state (upper) and a disconnected state (lower). In particular, FIG. 2 shows a portion of the display component 120 and a portion of the interconnection mechanism 130. As shown in the example of FIG. 2, the display component 120 includes a socket 125-1 for receipt of the prong 134-1 of the interconnection mechanism 130, a socket 127-1 for receipt of the latch 136-1 of the interconnection mechanism 130 and a socket 129-1 for receipt of the electrical connector 138-1 of the interconnection mechanism 130.

Further, in the example of FIG. 2, the interconnection mechanism 130 includes a brace 131-1, which may be implemented for attaching the base component 110 (not shown) to the interconnection mechanism 130. For example, a screw, bolt, etc., may be used to attach the base component 110 to the interconnection mechanism 130.

Yet further, in the example of FIG. 2, the interconnection mechanism 130 includes a peg 135, which cooperates with the actuator 142. More particularly, in the example of FIG. 2, the actuator 142 includes an actuator surface 141 that when translated axially inwardly (e.g., in an axial direction parallel to the pivot axis of the hinge 132-1), causes an arm 143 having a guide opening 144 to be guided axially to the right where the latch 136-1, which is attached to the arm 143 also translates axially to the right, which moves the latch 136-1 to a more central position with respect to the socket 127-1 of the display component 120 such that a hook end of the latch 136-1 clears an inner surface of the socket 127-1. Also shown is an extension 145, which connects to, for example, the latch 136-2 (see, e.g., FIG. 1). Thus, if a user desires to disconnect the display component 120, the user may apply force axially to the surface 141 of the actuator 142 to thereby shift the latches 136-1, 136-2 (see, e.g., FIG. 1) within respective sockets 127-1, 127-2 (not shown in FIG. 2) and then slide the display component 120 away from the interconnection mechanism 130 to remove the prongs 134-1, 134-2 (see, e.g., FIG. 1) from the sockets 125-1, 125-2 (not shown in FIG. 2).

In the example of FIG. 2, the brace 131-1 is part of the hinge 132-1 such that the interconnection mechanism 130 can pivot with respect to the base component 110 when the base component 110 is attached to the brace 131-1. As the display component 120 connects to the interconnection mechanism 130 in a releasable manner (e.g., latch/unlatch), when connected to the interconnection mechanism 130, the display component 120 pivots with the interconnection mechanism 130 and with respect to the base component 110 when the base component 110 is attached to the brace 131-1 of the interconnection mechanism 130.

Figure 3:
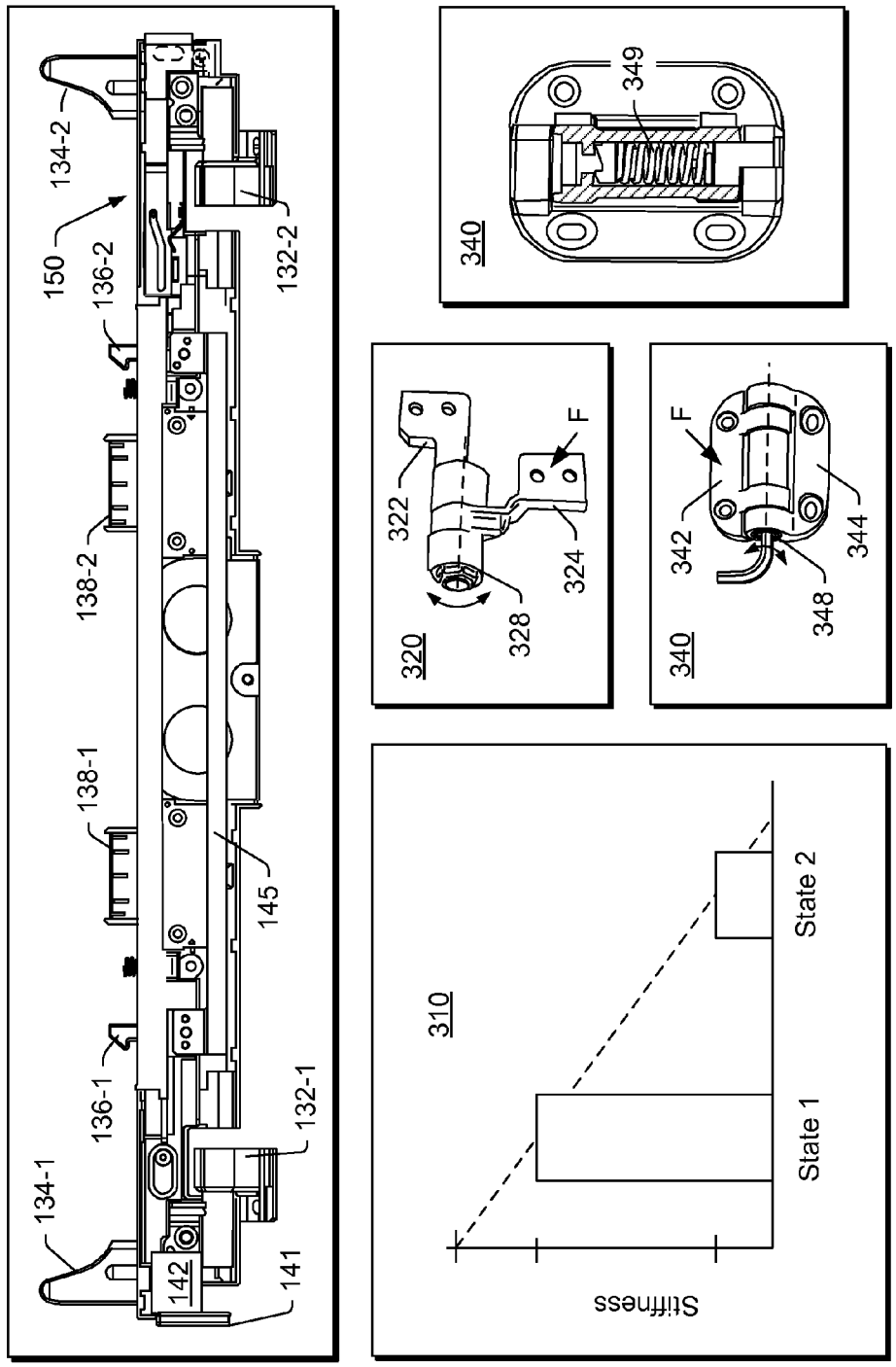
FIG. 3 is a diagram of an example an interconnection mechanism that includes one or more hinges adjustable between a high stiffness state and a low stiffness state.

FIG. 3 shows an example of the interconnection mechanism 130 that includes an obstruction mechanism 150, which can place the actuator 142 in an unobstructed state (as shown) or in an obstructed state (a plate slides to block a distal end of the extension 145). FIG. 3 also shows a plot 310 of stiffness, an example of an adjustable stiffness hinge 320 and an example of an adjustable tension hinge 340, which may also provide for adjustable stiffness (e.g., an adjustable tension and stiffness hinge).

The plot 310 shows hinge stiffness in two states where State 1 is a high stiffness state compared to State 2 (e.g., a low stiffness state compared to State 1). As an example, a hinge may include a mechanism for stiffness adjustment, which may be a state adjustment mechanism (e.g., for one or more states) or a continuous adjustment mechanism (see, e.g., dashed line).

As to the hinge 320, it includes a first connection plate 322, a second connection plate 324 and a stiffness adjustment mechanism 328. For example, by adjusting the mechanism 328, the force (F) required to move one of the plates with respect to the other plate may increase or decrease.

As to the hinge 340, it includes a first connection plate 342, a second connection plate 344 and a mechanism 348, which may provide for adjusting stiffness, adjusting tension or adjusting stiffness and tension. As an example, the hinge 340 may include a spring 349. As an example, a tool may be inserted into a socket of the hinge 340 whereby rotation of the tool causes the spring 349 to become more or less compressed, which, in turn, may impact stiffness, tension or stiffness and tension.

Figure 4:
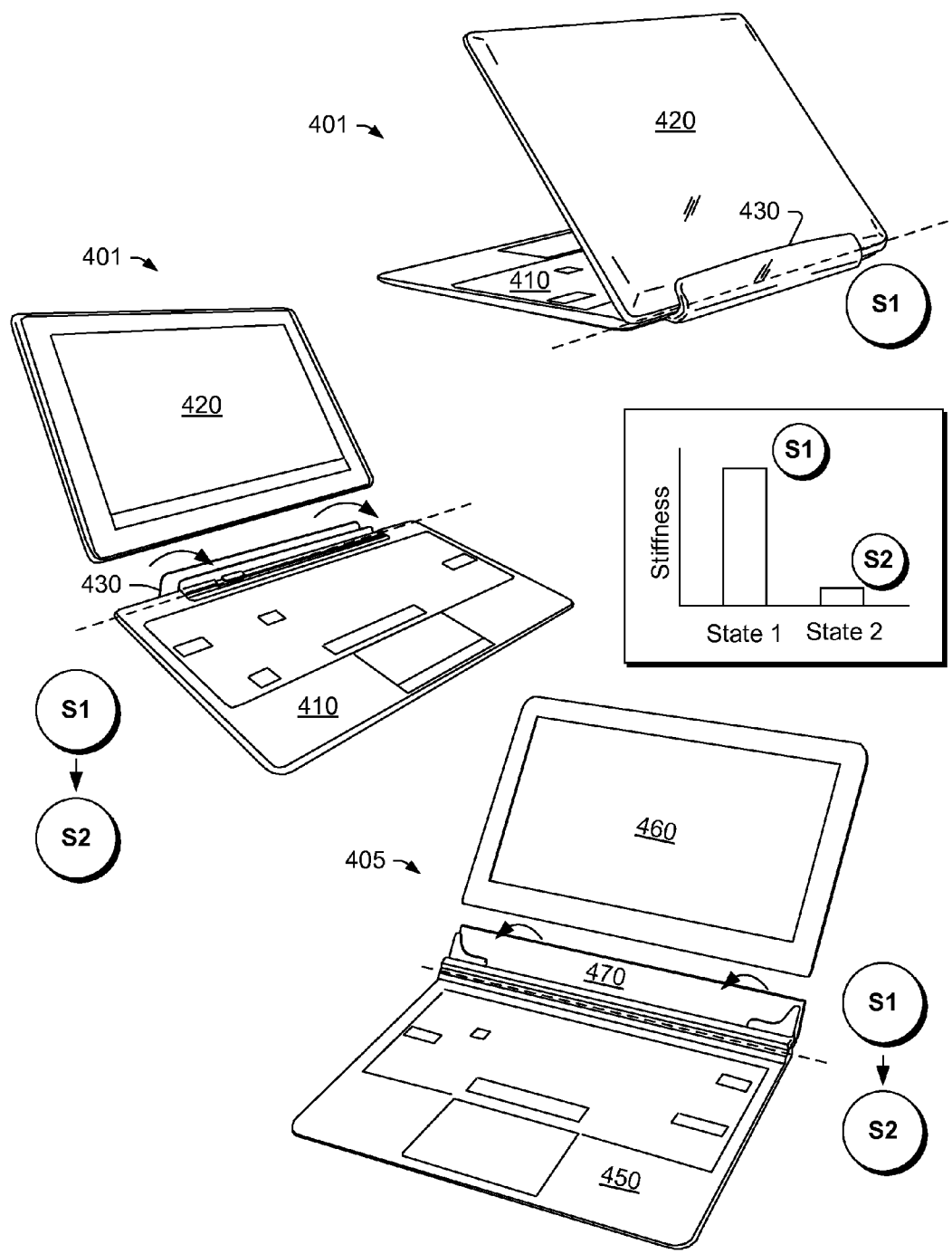
FIG. 4 is a diagram of two examples of assemblies with respect to high stiffness and low stiffness states of interconnection mechanisms.

FIG. 4 shows examples of two assemblies 401 and 405. The assembly 401 includes a base component 410, a display component 420 and an interconnection mechanism 430 and the assembly 405 includes a base component 450, a display component 460 and an interconnection mechanism 470. The assemblies 401 and 405 can each include an adjustment mechanism to adjust stiffness of a hinge or hinges of the respective interconnection mechanisms 430 and 470. For example, stiffness may be adjusted via an adjustment mechanism to a first state (S1) and to a second state (S2) of lower stiffness than the first state (S1).

As to the assembly 401, the interconnection mechanism 430 includes one or more hinges that define a pivot axis about which the interconnection mechanism 430 may pivot with respect to the base component 410. Where the adjustment mechanism is adjusted from a first stiffness state (S1) to a second, lower stiffness state (S2), pivoting of the interconnection mechanism 430 takes less force, for example, than the force required to support the display component 420. As shown, the interconnection mechanism 430 may be pivoted such that an upper edge of the interconnection mechanism 430 approaches the base component 410 (e.g., for purposes of storage, etc.).

As to the assembly 405, the interconnection mechanism 470 includes one or more hinges that define a pivot axis about which the interconnection mechanism 470 may pivot with respect to the base component 450. Where the adjustment mechanism is adjusted from a first stiffness state (S1) to a second, lower stiffness state (S2), pivoting of the interconnection mechanism 470 takes less force, for example, than the force required to support the display component 460. As shown, the interconnection mechanism 470 may be pivoted such that an upper edge of the interconnection mechanism 470 approaches the base component 450 (e.g., for purposes of storage, etc.).

While the examples of FIG. 4 show transitions from a high stiffness state (S1) to a low stiffness state (S2), reverse transitions may be made from the low stiffness state (S2) to the high stiffness state (S1). For example, before, during or after connection of the display component 420 to the interconnection mechanism 430 or the display component 460 to the interconnection mechanism 470, a transition may be made from a low stiffness state (S2) to a high stiffness state (S1) where the latter is sufficient to support the display component 420 or 460 at an angle with respect to its respective base component 410 or 450 (e.g., without any significant change in the angle with respect to time to maintain a user selected angle).

Figure 5:
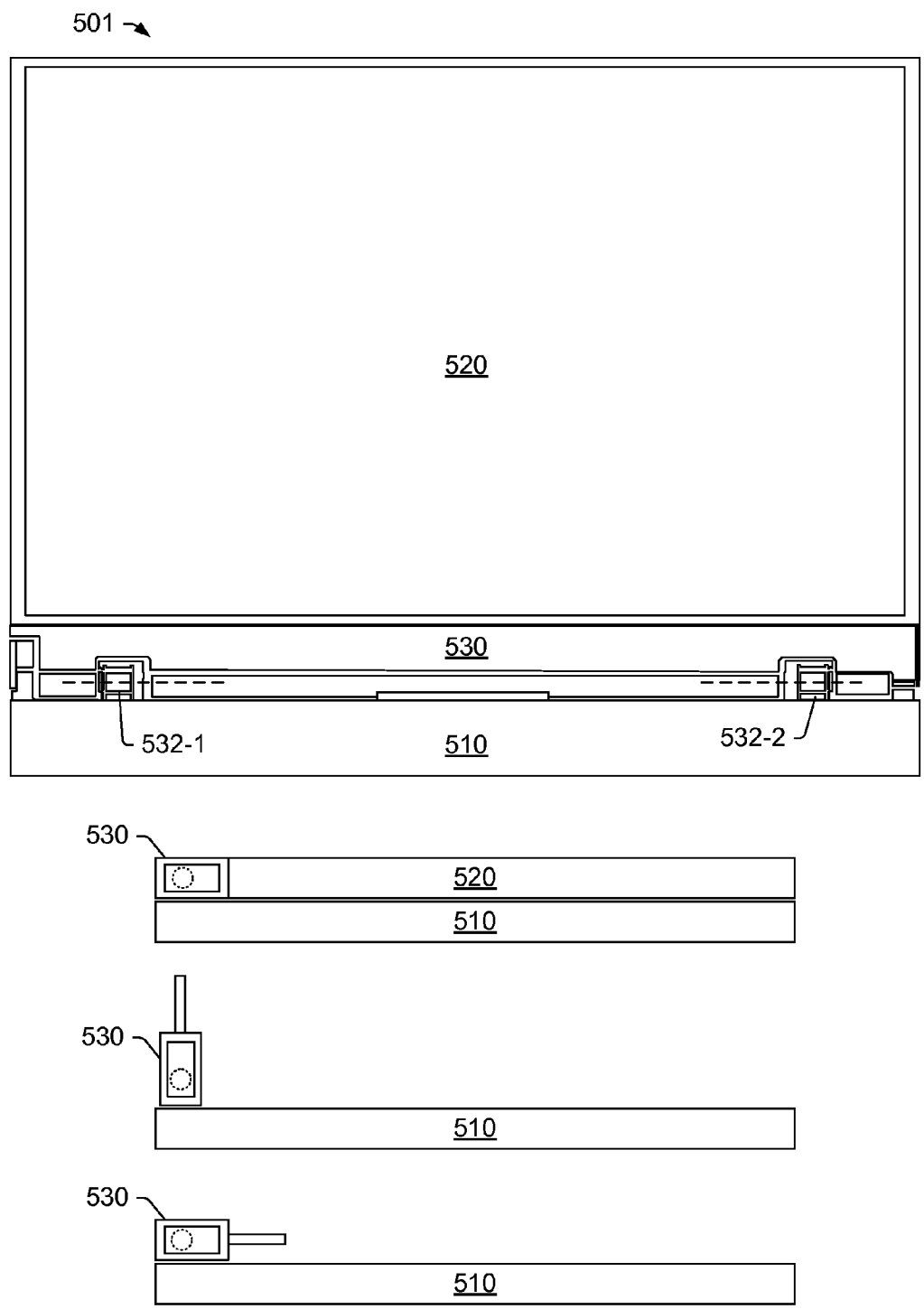
FIG. 5 is a diagram of an example of an assembly that includes an interconnection mechanism.

FIG. 5 shows an example of an assembly 501 that includes a base component 510, a display component 520 and an interconnection mechanism 530 that includes hinges 532-1 and 532-2. As shown, the display component 520 may be connected to the interconnection mechanism 530 and pivoted toward the base component 510 (e.g., closed clamshell) and the display component 520 may be disconnected from the interconnection mechanism 530 and the interconnection mechanism 530 may be pivoted toward the base component 510 (e.g., to bring one or more prongs, features, etc., of the interconnection mechanism 530 closer to the base component 510).

Figure 6:
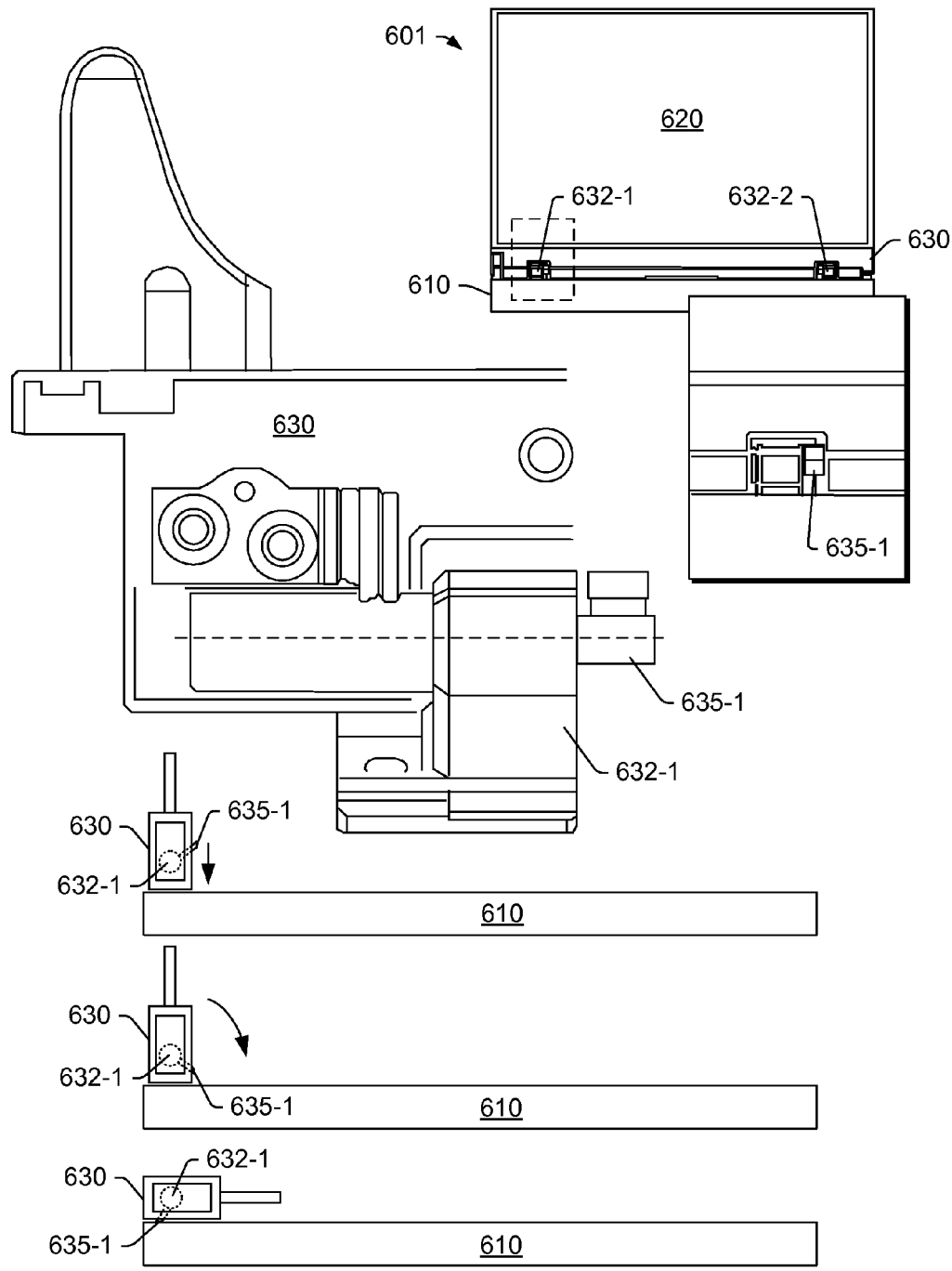
FIG. 6 is a diagram of an example of an interconnection mechanism of an assembly that includes one or more stiffness levers.

FIG. 6 shows an example of an assembly 601 that includes a base component 610, a display component 620 and an interconnection mechanism 630 that includes hinges 632-1 and 632-2. As shown, the display component 620 may be disconnected from the interconnection mechanism 630 and the interconnection mechanism 630 may be pivoted toward the base component 610 (e.g., to bring one or more prongs, features, etc., of the interconnection mechanism 630 closer to the base component 610).

To facilitate pivoting of the interconnection mechanism 630 toward the base component 630, a stiffness lever 635-1 connects to the hinge 632-1. The stiffness lever 635-1 may be positioned in a first position that provides for a first stiffness and in a second position that provides for a second, lower stiffness. As shown, the first position may be an up position and the second position may be a down position. For example, in the first position, the stiffness lever 635-1 may cause the hinge 632-1 to have a coefficient of friction that is sufficient to maintain the display component 620 at an angle with respect to the base component 610; whereas, in the second position, the stiffness lever 635-1 may cause the hinge 632-1 to have a lower coefficient of friction that allows for pivoting of the interconnection mechanism 630 toward the base component 610 (e.g., with less force than for the stiffness lever 635-1 in the first position). To adjust stiffness, in the example of FIG. 6, the stiffness lever 635-1 may be rotated to increase force on components (e.g., via an end nut), alter alignment of components (e.g., shift an axel, shift a shim, etc.), adjust a spring, etc., and vice versa to decrease force on components. As to force, an adjustment may adjust frictional force, spring force, frictional and spring force, etc.

Figure 7:
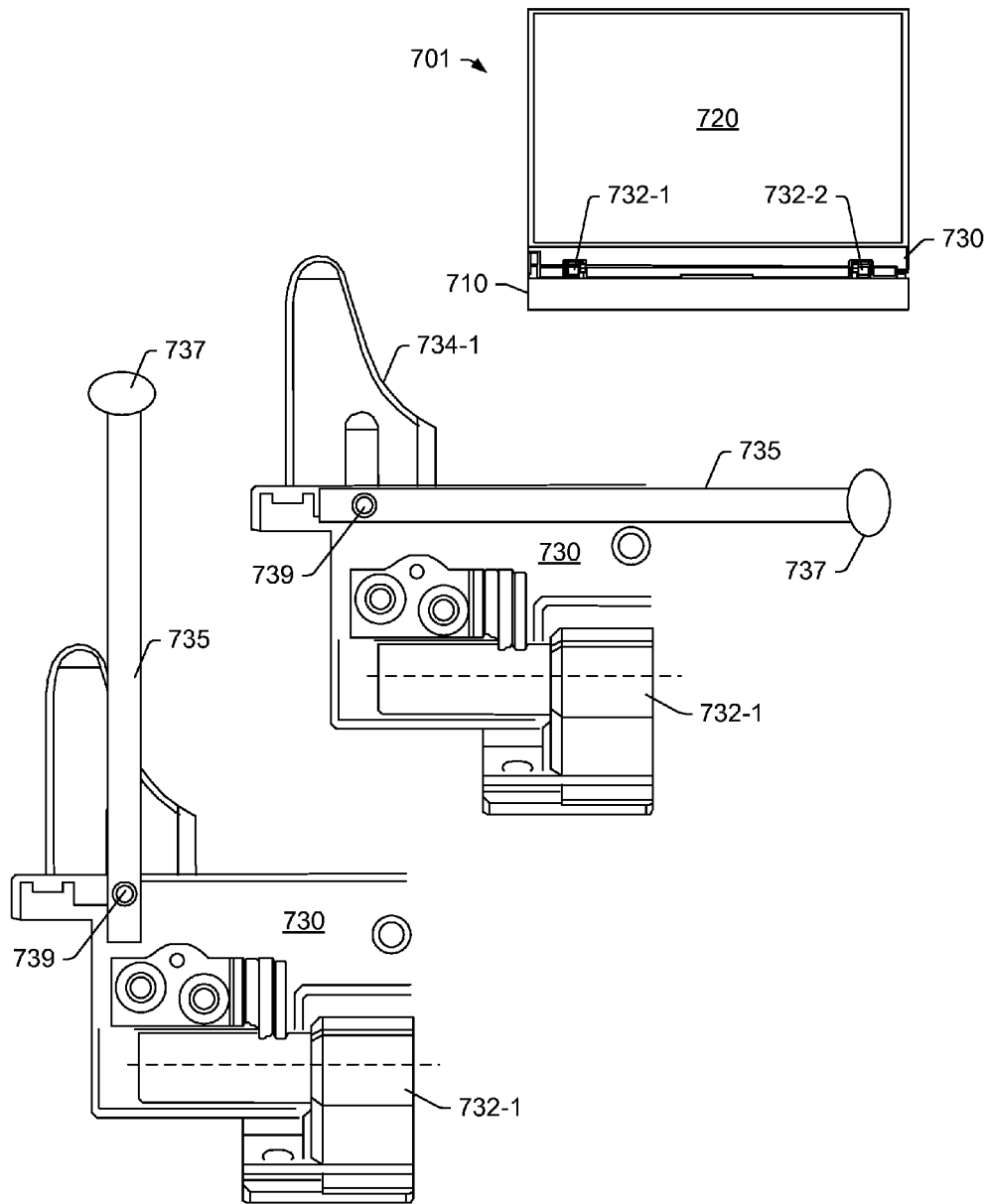
FIG. 7 is a diagram of an example of an interconnection mechanism of an assembly that includes a tool for adjusting position of the interconnection mechanism.

FIG. 7 shows an example of an assembly 701 that includes a base component 710, a display component 720 and an interconnection mechanism 730 that includes hinges 732-1 and 732-2 and prongs 734-1 and 734-2 (not shown). As an example, the display component 720 may be disconnected from the interconnection mechanism 730 and the interconnection mechanism 730 may be pivoted toward the base component 710 (e.g., to bring one or more prongs, features, etc., of the interconnection mechanism 730 closer to the base component 710).

To facilitate pivoting of the interconnection mechanism 730 toward the base component 710, a lever 735 optionally including a grip 737 can rotate about an axel 739 fit into the interconnection mechanism 730 to extend an end of the lever 735 outwardly away from the interconnection mechanism 730 to a distance beyond the prong 734-1 to gain leverage for a user to pivot the interconnection mechanism 730 toward the base component 710. To reposition the interconnection mechanism 730, for example, for connection of the display component 720 to the interconnection mechanism 730, a user may grasp the lever 735 (e.g., via the grip 737) to pivot the interconnection mechanism 730 away from the base component 710, to an angle sufficient for connection of the display component 720 to the interconnection mechanism 730. In the example of FIG. 7, the interconnection mechanism 730 may include a recess for at least partially seating the lever 735, for example, with a portion of the grip 737 accessible to a user when the display component 720 is disconnected (e.g., to allow for a thumb and index finger grasp, etc.).

Figure 8:
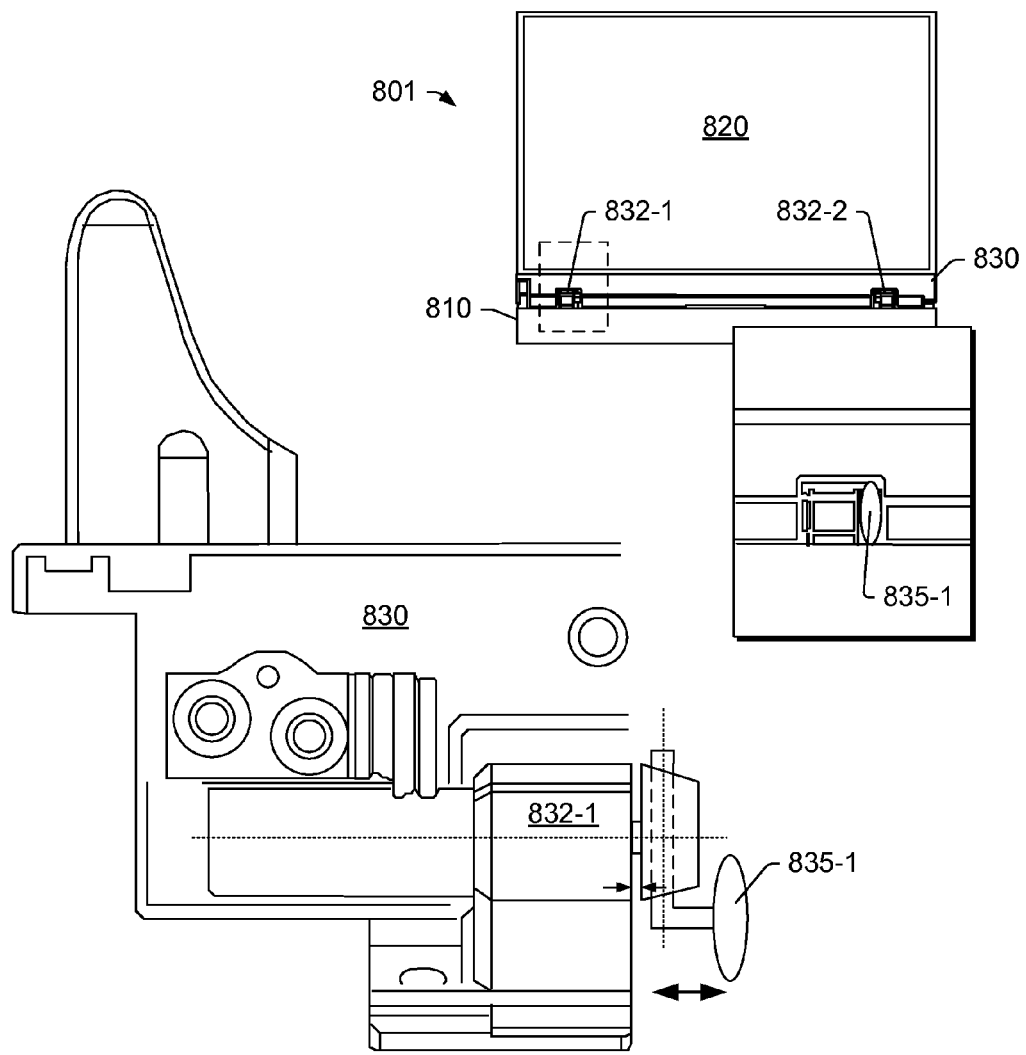
FIG. 8 is a diagram of an example of an interconnection mechanism of an assembly that includes one or more stiffness levers.

FIG. 8 shows an example of an assembly 801 that includes a base component 810, a display component 820 and an interconnection mechanism 830 that includes hinges 832-1 and 832-2. As an example, the display component 820 may be disconnected from the interconnection mechanism 830 and the interconnection mechanism 830 may be pivoted toward the base component 810 (e.g., to bring one or more prongs, features, etc., of the interconnection mechanism 830 closer to the base component 810).

To facilitate pivoting of the interconnection mechanism 830 toward the base component 810, a stiffness lever 835-1 connects to the hinge 832-1. The stiffness lever 835-1 may be positioned in a first position that provides for a first stiffness and in a second position that provides for a second, lower stiffness. As shown, the first position for the stiffness lever 835-1 may be a position toward the hinge 832-1 and the second position for the stiffness lever 835-1 may be a position away from the hinge 832-1. For example, in the first position, the stiffness lever 835-1 may cause the hinge 832-1 to have a coefficient of friction that is sufficient to maintain the display component 820 at an angle with respect to the base component 810; whereas, in the second position, the stiffness lever 835-1 may cause the hinge 832-1 to have a lower coefficient of friction that allows for pivoting of the interconnection mechanism 830 toward the base component 810 (e.g., with less force than for the stiffness lever 835-1 in the first position).

In the example of FIG. 8, the stiffness lever 835-1 may act as a clamp that can apply an axial force to the hinge 832-1 (see, e.g., gap, which may be closed by positioning the stiffness lever 835-1). The stiffness lever 835-1 may include an L-shaped member where a grip end, accessible to a user, exists at one end of the L-shaped member for swinging about an axis defined by the other end of the L-shaped member (e.g., to position the grip end to increase or decrease stiffness of the hinge 832-1).

Figure 9:
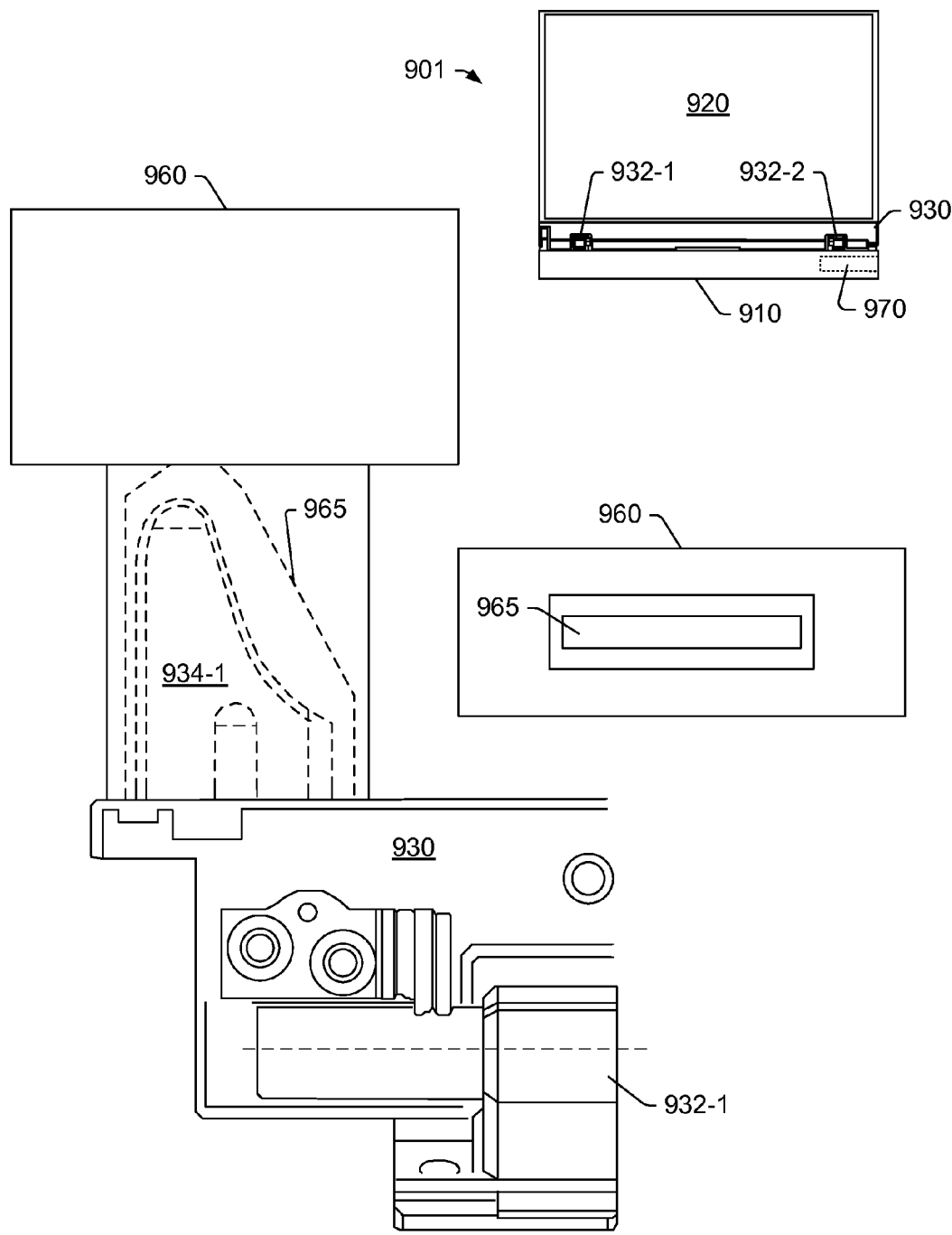
FIG. 9 is a diagram of an example of an interconnection mechanism of an assembly and a tool for adjusting position of the interconnection mechanism.

FIG. 9 shows an example of an assembly 901 that includes a base component 910, a display component 920 and an interconnection mechanism 930 that includes hinges 932-1 and 932-2 and prongs 934-1 and 934-2 (not shown). As an example, the display component 920 may be disconnected from the interconnection mechanism 930 and the interconnection mechanism 930 may be pivoted toward the base component 910 (e.g., to bring one or more prongs, features, etc., of the interconnection mechanism 930 closer to the base component 910).

To facilitate pivoting of the interconnection mechanism 930 toward the base component 910, a tool 960 includes a recess 965 to fit the prong 934-1 where the tool 960 extends outwardly away from the interconnection mechanism 930 to a distance beyond the prong 934-1 to gain leverage for a user to pivot the interconnection mechanism 930 toward the base component 910. To reposition the interconnection mechanism 930, for example, for connection of the display component 920 to the interconnection mechanism 930, a user may grasp the tool 960 to pivot the interconnection mechanism 930 away from the base component 910, to an angle sufficient for connection of the display component 920 to the interconnection mechanism 930. As an example, the base component 910 may include a storage compartment 970 (e.g., a recess, etc.) for storing the tool 960. In such an example, a spring latching/unlatching mechanism may be operable by a depression of a button or depression of the tool 960 to cause a spring to shift the tool 960 partially out of the compartment 970 (e.g., akin to a memory card slot type of spring mechanism, etc.).

Figure 10:
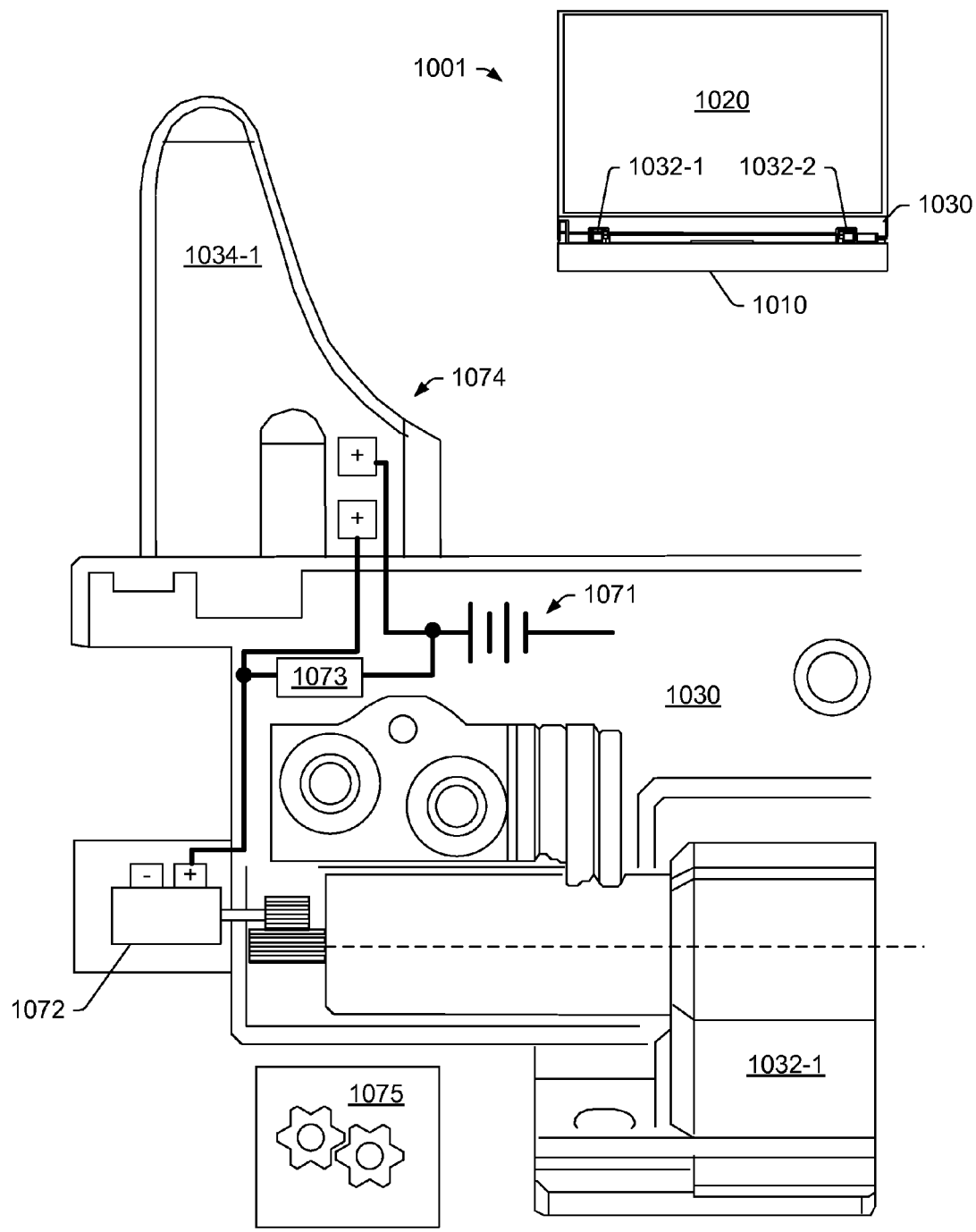
FIG. 10 is a diagram of an example of an interconnection mechanism of an assembly that includes an electric motor.

FIG. 10 shows an example of an assembly 1001 that includes a base component 1010, a display component 1020 and an interconnection mechanism 1030 that includes hinges 1032-1 and 1032-2. As an example, the display component 1020 may be disconnected from the interconnection mechanism 1030 and the interconnection mechanism 1030 may be pivoted toward the base component 1010 (e.g., to bring one or more prongs, features, etc., of the interconnection mechanism 1030 closer to the base component 1010).

To facilitate pivoting of the interconnection mechanism 1030 toward the base component 1010, a power source 1071 may power an electric motor 1072 via circuitry 1073, which may be actuated by a switch 1074. As an example, the electric motor 1072 may drive gears 1075 that cause pivoting of about the hinge 1032-1, reduction in stiffness of the hinge 1032-1, change in tension of the hinge 1032-1, etc. As an example, the switch 1074 may be switched by presence or absence of the display component 1020. For example, the display component 1020 may include a socket that includes a contact strip that bridges electric connectors of the switch 1074, which may be mounted on the prong 1034-1.

As an example, a button may be provided for a user to activate the electric motor 1072. In such an example, depression of the button may cause the electric motor 1072 to pivot the interconnection mechanism 1030 about an axis of the hinge 1032-1 toward or away from the base component 1010 (e.g., to pivot the prong 1034-1 down or up). For example, the button may alternate direction of rotation of a shaft of the electric motor 1072 such that the electric motor 1072 alternately pivots the prong 1034-1 down and up.

As to the power source 1071, it may be a power source of the base component 1010. As an example, an interconnection mechanism may include more than one electric motor for purposes of pivoting prongs, an interconnection mechanism, etc.

Figure 11:
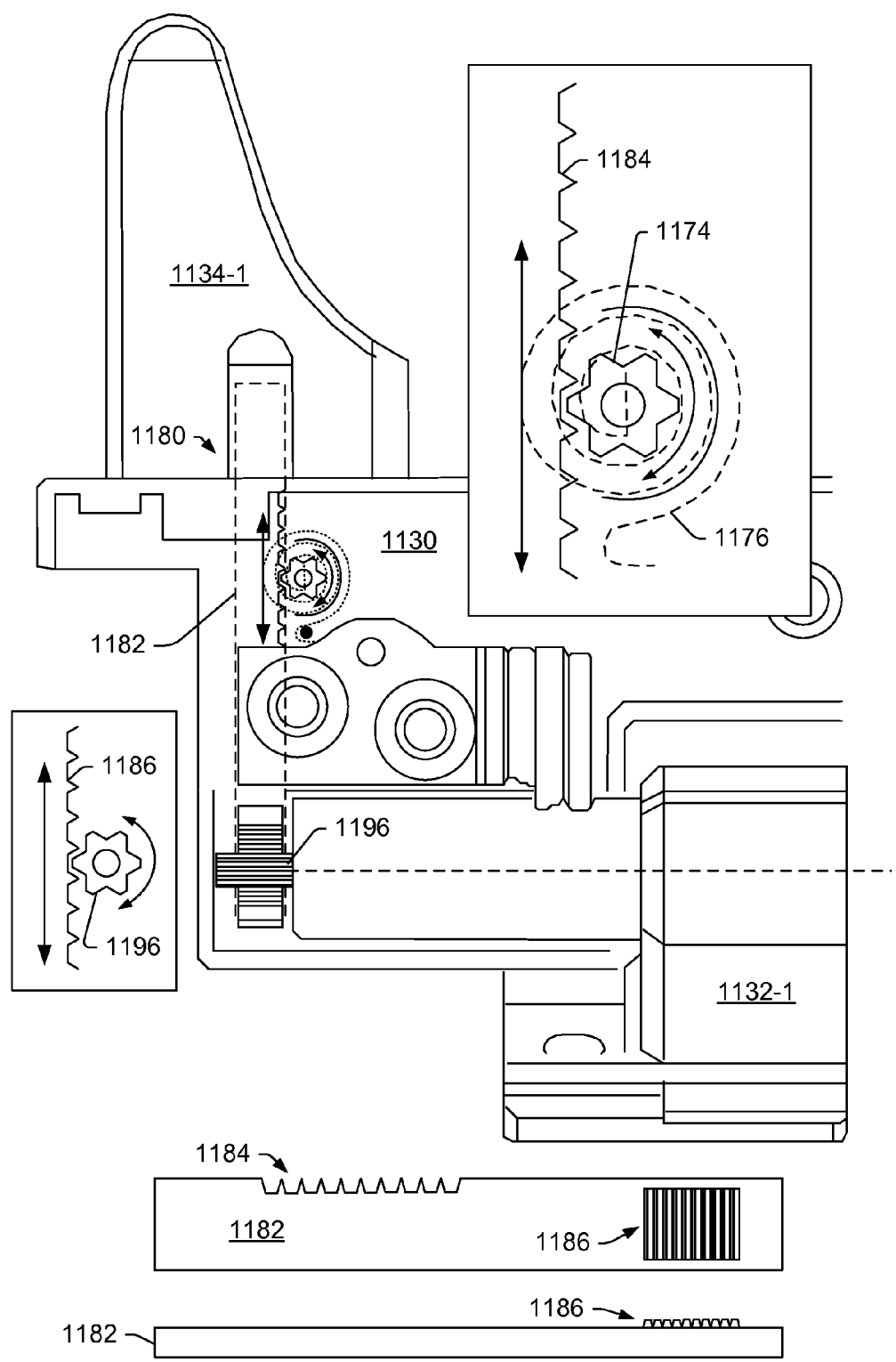
FIG. 11 is a diagram of an example of an interconnection mechanism of an assembly that includes a stiffness lever.

FIG. 11 shows an example of a lever mechanism 1180 of an interconnection mechanism 1130 that includes at least one hinge 1132-1 and at least one prong 1134-1. The interconnection mechanism 1130 may interconnect two components such as a display component and a base component (see, e.g., the assembly 101 of FIG. 1).

In the example of FIG. 11, the lever mechanism 1180 includes a lever 1182 with a side rack 1184 and a surface rack 1186. The side rack 1184 meshes with a gear 1174 biased by a spring 1176. The spring 1176 may bias the gear 1174 to push the lever 1182 upward, for example, to a position adjacent the prong 1134-1. When a socket of a display component is positioned with respect to prong 1134-1 (e.g., to connect the display component to the interconnection mechanism 1130), a tab in the socket may engage an end of the lever 1182 and force the lever 1182 downward. Further, when the display component is removed (e.g., disconnected from the interconnection mechanism 1130), the spring 1176 can force the lever 1182 upward (e.g., as the end of the lever 1182 is no longer impeded by the tab). In such an example, upon downward or upward movement of the lever 1182, the surface rack 1186 can engage a gear 1196 of the hinge 1132-1. Thus, as the lever 1182 translates, the gear 1196 of the hinge 1132-1 rotates (e.g., either clockwise or counter-clockwise). In such an example, rotation of the gear 1196 may cause pivoting about the hinge 1132-1, reduction in stiffness of the hinge 1132-1, change in tension of the hinge 1132-1, etc. Such action may move or facilitate movement of the interconnection mechanism 1130 toward a base component (e.g., when a display component is not connected to the interconnection mechanism 1130).

As an example, an assembly can include a mechanism, tool, etc., to facilitate positioning of an interconnection mechanism, a prong, etc. As an example, a threaded interior of a knot of an elongated hinge may include a threaded interior where turning causes the threading to turn down against a friction plate of the hinge. As an example, a levering mechanism can include a lever that can pull-in when a component is connected to an interconnection mechanism and that can pull-out when the component is disconnected from the interconnection mechanism. As an example, a hook of a latch mechanism may act to adjust a hinge (e.g., to adjust stiffness, tension, etc.). As an example, an actuator of a latch mechanism may include a linkage to a hinge to adjust the hinge (e.g., to adjust stiffness, tension, etc.).

As an example, an assembly may include a tool (e.g., a piece shipped with the assembly) that can be used as a lever to pivot prongs, etc., about one or more hinges (e.g., axis or axes defined by the one or more hinges). As an example, a plastic tool may be snapped into a base component when not in use, and can be snapped off, inserted into or onto an interconnection mechanism and then used to pivot prongs, etc. As an example, such a tool may be replaced on or in the base component after pivoting of the prongs, etc.

As an example, an assembly can include a flip up handle to lever down one or more prongs, etc., of an interconnection mechanism. As an example, such a handle may nest under a hinge-cover and be attached via a secondary hinge (e.g., an axel, etc.). In such an example, the handle may be raised, the one or more prongs, etc., pivoted, the handle rotated about the secondary hinge and a hinge-cover placed over the handle.

As an example, an assembly may include an electric motor, optionally with a button or other type of switch. In such an example, when the button is pressed, the motor may engage a hinge to pivot one or more prongs, etc. As an example, an electric motor may be embedded in a base component or an interconnection mechanism and power available when a button is pressed or when a switch is activated.

As an example, an assembly may include cables that cross in a portion of the assembly (e.g., an interconnection mechanism) next to one or more hinges. In such an example, a spring mechanism may be actuated by the cables that act to adjust the one or more hinges (e.g., stiffness, tension, etc.). For example, a cable may be accessible that can be pulled (e.g., optionally with a grip) where pulling of the cable adjusts hinge tension of one or more hinges. In such an example, cable ends may connect to hinge shims and pulling and releasing of the cable may act to position each hinge shim with respect to a space between an axel and a bore of a hinge to thereby increase or decrease tension (e.g., via frictional force).

As an example, an assembly may include a spiral cam that adjusts stiffness, tension, etc., of one or more hinges. For example, a mechanism such as an expand/contract mechanism of a butterfly keyboard may be implemented for adjusting stiffness, tension, etc.

As an example, an assembly may include a mechanism to adjust stiffness, tension, etc., of one or more hinges, for example, to allow for rotation of one or more prongs, etc., with light force. In such an example, when a display component is latched in place (e.g., seated with respect to the one or more prongs, etc.), when opened to a predetermined viewing angle, the stiffness of the one or more hinges may be increased. And, when the display component is unlatched and removed, the mechanism can respond to disengagement by adjusting the one or more hinges for pivoting with gentle finger force (e.g., to pivot toward a base component).

As an example, an assembly can include a first component; a second component that includes a socket; a processor and a memory accessible by the processor, the processor and memory being included in one or more of the first component and the second component; and an interconnection mechanism for pivotable interconnection of the first component and the second component about a pivot axis where the interconnection mechanism includes a hinge that defines the pivot axis, a prong pivotable about the pivot axis, a latch mechanism to latch the second component to the interconnection mechanism with the prong received by the socket of the second component, an actuator to unlatch the latch mechanism, and a lever to adjust the hinge to a high stiffness state for the second component latched to the interconnection mechanism and to adjust the hinge to a low stiffness state for the second component unlatched from the interconnection mechanism.

As an example, a second component of such an assembly can include a display accessible by the processor. As an example, a first component of such an assembly can include a keyboard accessible by the processor.

As an example, a lever can extend from a hinge for adjustment of the hinge (e.g., hinge stiffness, tension, etc.). As an example, an interconnection mechanism can include a plurality of hinges and a plurality of levers. As an example, tension of a hinge may differ for a high stiffness state and a low stiffness state.

As an example, an assembly can include a lever that is positionable to a first position that adjusts a hinge to a high stiffness state and a second position that adjusts a hinge to a low stiffness state. As an example, such a lever can include a rotational axis aligned with or parallel to a pivot axis of a hinge. As an example, a lever can include a rotational axis orthogonal to a pivot axis of a hinge. As an example, a prong can include a guide to guide a lever between a first position that adjusts a hinge to a high stiffness state and a second position that adjusts the hinge to a low stiffness state. As an example, a socket of a second component of an assembly can include a tab that engages a lever and, with the second component latched to an interconnection mechanism of the assembly, that positions the lever in a high stiffness state.

As an example, an assembly can include a first component; a second component that includes a socket; a processor and a memory accessible by the processor, the processor and memory being included in one or more of the first component and the second component; an interconnection mechanism for pivotable interconnection of the first component and the second component about a pivot axis where the interconnection mechanism includes a hinge that defines the pivot axis, a prong pivotable about the pivot axis, a latch mechanism to latch the second component to the interconnection mechanism with the prong received by the socket of the second component, and an actuator to unlatch the latch mechanism; and a positionable lever to pivot the prong about the pivot axis.

As an example, a positionable lever may be a retractable lever. As an example, an assembly can include a recess configured for receipt of a positionable lever. As an example, an interconnection mechanism of an assembly can include a recess, the recess being accessible upon removal of a second component from the interconnection mechanism. As an example, a positionable lever can include a lever socket configured for receipt of a prong of an interconnection mechanism of an assembly.

As an example, an assembly can include a first component; a second component; a processor and a memory accessible by the processor, the processor and memory being included in one or more of the first component and the second component; and an interconnection mechanism for pivotable interconnection of the first component and the second component about a pivot axis where the interconnection mechanism includes a hinge that defines the pivot axis, a latch mechanism to latch the second component to the interconnection mechanism, an actuator to unlatch the latch mechanism, and an electric motor to adjust the hinge for the second component latched to the interconnection mechanism and to adjust the hinge for the second component unlatched from the interconnection mechanism. In such an example, the electric motor may adjust stiffness of the hinge to a high stiffness state for the second component latched to the interconnection mechanism and to a low stiffness state for the second component unlatched from the interconnection mechanism.

As an example, an assembly can include a button to actuate an electric motor. As an example, an assembly can include circuitry to automatically actuate an electric motor responsive to removal of a second component of the assembly from an interconnection mechanism of the assembly.

As an example, a method can include providing an interconnection mechanism for pivotable interconnection of a first component and a second component about a pivot axis of a hinge; providing an actuator for, upon actuation, disconnecting the second component from the interconnection mechanism while maintaining connection between the interconnection mechanism and the first component; and providing a pivot tool to pivot at least part of the interconnection mechanism about the pivot axis of the hinge with respect to the first component with the second component disconnected from the interconnection mechanism.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 12:
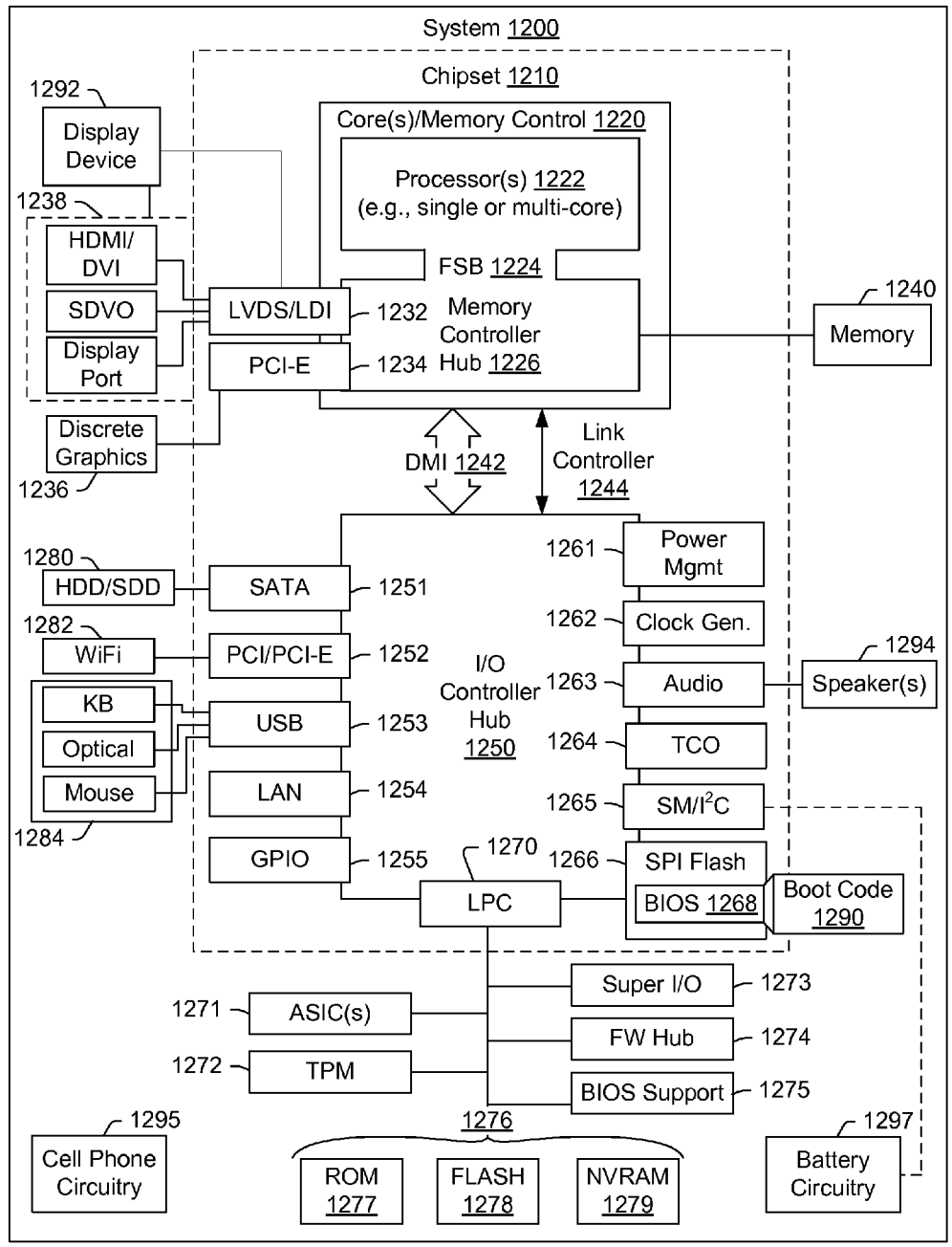
FIG. 12 is a diagram of an example of a system that includes one or more processors.

While various examples of circuits or circuitry have been discussed, FIG. 12 depicts a block diagram of an illustrative computer system 1200. The system 1200 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1200. As an example, a device such as one of the devices or components of FIG. 1 may include at least some of the features of the system 1200.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I$^2$C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As mentioned, a SMBus may be operable via a LPC (see, e.g., the LPC interface 1270), via an I²C interface (see, e.g., the SM/I²C interface 1265), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An assembly comprising:
a first component;
a second component that comprises a socket;
a processor and a memory accessible by the processor, the processor and memory being included in one or more of the first component and the second component; and
an interconnection mechanism for pivotable interconnection of the first component and the second component about a pivot axis wherein the interconnection mechanism comprises
a hinge that defines the pivot axis,
a prong pivotable about the pivot axis,
a latch mechanism to latch the second component to the interconnection mechanism with the prong received by the socket of the second component,
an actuator to unlatch the latch mechanism, and
a lever to adjust the hinge to a high stiffness state for the second component latched to the interconnection mechanism and to adjust the hinge to a low stiffness state for the second component unlatched from the interconnection mechanism.

2. The assembly of claim 1 wherein the second component comprises a display accessible by the processor.

3. The assembly of claim 1 wherein the first component comprises a keyboard accessible by the processor.

4. The assembly of claim 1 wherein the lever extends from the hinge.

5. The assembly of claim 1 wherein the interconnection mechanism comprises a plurality of hinges and a plurality of levers.

6. The assembly of claim 1 wherein tension of the hinge differs for the high stiffness state and the low stiffness state.

7. The assembly of claim 1 wherein the lever comprises a first position that adjusts the hinge to the high stiffness state and a second position that adjusts the hinge to the low stiffness state.

8. The assembly of claim 7 wherein the lever comprises a rotational axis aligned with or parallel to the pivot axis of the hinge.

9. The assembly of claim 7 wherein the lever comprises a rotational axis orthogonal to the pivot axis of the hinge.

10. The assembly of claim 7 wherein the prong comprises a guide to guide the lever between the first position that adjusts the hinge to the high stiffness state and a second position that adjusts the hinge to the low stiffness state.

11. The assembly of claim 10 wherein the socket of the second component comprises a tab that engages the lever and, with the second component latched to the interconnection mechanism, that positions the lever in the high stiffness state.

12. An assembly comprising:
a first component;
a second component that comprises a socket;
a processor and a memory accessible by the processor, the processor and memory being included in one or more of the first component and the second component; and
an interconnection mechanism for pivotable interconnection of the first component and the second component about a pivot axis wherein the interconnection mechanism comprises
a hinge that defines the pivot axis,
a prong pivotable about the pivot axis,
a latch mechanism to latch the second component to the interconnection mechanism with the prong received by the socket of the second component,
an actuator to unlatch the latch mechanism, and
an electric motor to adjust stiffness of the hinge for the second component latched to the interconnection mechanism and to adjust stiffness of the hinge for the second component unlatched from the interconnection mechanism.

13. The assembly of claim 12 wherein the electric motor adjusts stiffness of the hinge to a high stiffness state for the second component latched to the interconnection mechanism and to a low stiffness state for the second component unlatched from the interconnection mechanism.

14. The assembly of claim 12 comprising a button to actuate the electric motor.

15. The assembly of claim 12 comprising circuitry to automatically actuate the electric motor responsive to removal of the second component from the interconnection mechanism.

16. An assembly comprising:
a first component;
a second component that comprises a socket;
a processor and a memory accessible by the processor, the processor and memory being included in one or more of the first component and the second component; and
an interconnection mechanism for pivotable interconnection of the first component and the second component about a pivot axis wherein the interconnection mechanism comprises
a hinge that defines the pivot axis,
a prong pivotable about the pivot axis, a latch mechanism to latch the second component to the interconnection mechanism with the prong received by the socket of the second component, an actuator to unlatch the latch mechanism, and an electric motor to pivot the prong about the pivot axis defined by the hinge from a down orientation to an up orientation that positions an end of the prong away from the first component to latch the second component to the interconnection mechanism.

17. The assembly of claim 16 comprising a button to actuate the electric motor.

18. The assembly of claim 16 comprising circuitry to automatically actuate the electric motor responsive to removal of the second component from the interconnection mechanism.

* * * * *